(12) United States Patent
Yokoyama et al.

(10) Patent No.: US 11,123,824 B2
(45) Date of Patent: Sep. 21, 2021

(54) SOLDER ALLOY

(71) Applicant: SENJU METAL INDUSTRY CO., LTD., Tokyo (JP)

(72) Inventors: Takahiro Yokoyama, Tokyo (JP); Shunsaku Yoshikawa, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/605,744

(22) PCT Filed: Dec. 26, 2018

(86) PCT No.: PCT/JP2018/047747
§ 371 (c)(1),
(2) Date: Oct. 16, 2019

(87) PCT Pub. No.: WO2019/131718
PCT Pub. Date: Jul. 4, 2019

(65) Prior Publication Data
US 2020/0376606 A1    Dec. 3, 2020

(30) Foreign Application Priority Data

Dec. 31, 2017   (JP) .............................. JP2017-255303

(51) Int. Cl.
*B23K 35/26*   (2006.01)
*B23K 103/08*   (2006.01)

(52) U.S. Cl.
CPC ........ *B23K 35/262* (2013.01); *B23K 2103/08* (2018.08)

(58) Field of Classification Search
None
See application file for complete search history.

(56) References Cited

U.S. PATENT DOCUMENTS

| | | | | |
|---|---|---|---|---|
| 2004/0115088 A1* | 6/2004 | Ohnishi | ................. | C22C 13/00 420/560 |
| 2004/0258556 A1* | 12/2004 | Kim | ....................... | C22C 13/00 420/560 |
| 2011/0303448 A1 | 12/2011 | Anderson et al. | | |
| 2013/0327444 A1 | 12/2013 | Sawamura et al. | | |
| 2014/0030140 A1 | 1/2014 | Nishimura et al. | | |
| 2015/0146394 A1 | 5/2015 | Terashima et al. | | |

(Continued)

FOREIGN PATENT DOCUMENTS

| | | |
|---|---|---|
| CN | 102029479 | 4/2011 |
| CN | 103753047 A | 4/2014 |
| CN | 105665956 A | 6/2016 |

(Continued)

OTHER PUBLICATIONS

English language machine translation of JP-2011041979-A to Ikeda. Generated Nov. 25, 2020. (Year: 2020).*

(Continued)

*Primary Examiner* — Brian D Walck
(74) *Attorney, Agent, or Firm* — Leason Ellis LLP

(57) ABSTRACT

A solder alloy has an alloy composition including, in mass %, 0.8% to 10% of Cu and Sn. The solder alloy includes an intermetallic compound. The intermetallic compound has a maximum grain size of 100 μm or less in a region at least 50 μm away from a surface of the solder alloy.

6 Claims, 2 Drawing Sheets

(56) References Cited

U.S. PATENT DOCUMENTS

2015/0319877 A1  11/2015  Ohashi et al.
2017/0216975 A1* 8/2017  Tachibana ............... C22C 13/02

FOREIGN PATENT DOCUMENTS

| | | | |
|---|---|---|---|
| JP | 09-122967 | | 5/1997 |
| JP | 2003-001482 A | | 1/2003 |
| JP | 2004141910 A | * | 5/2004 |
| JP | 2004-181485 A | | 6/2004 |
| JP | 2005-046882 A | | 2/2005 |
| JP | 2011-041979 A | | 3/2011 |
| JP | 2011041979 A | * | 10/2011 |
| JP | 2013-013916 A | | 1/2013 |
| JP | 2017-196647 A | | 11/2017 |
| WO | WO-2014/084242 A1 | | 6/2014 |
| WO | WO-2015/111587 A1 | | 7/2015 |

OTHER PUBLICATIONS

English language machine translation of JP-2004141910-A to Amami et al. Generated Feb. 23, 2021. (Year: 2021).*

Chinese Office Action dated Mar. 25, 2020 for the corresponding Chinese Patent Application No. 201880028510.6.

International Search Report and Written Opinion dated Mar. 5, 2019 for the corresponding PCT International Application No. PCT/JP2018/047747.

Notice of Reason for Refusal dated Mar. 6, 2018 for the corresponding Japanese Patent Application No. 2017-255303.

Yasutaka Hashimoto et al., "Current Status and Future Plan of Viscosity Measurement for the Lead-Free Solder", *Journal of the Japan Institute of Metals and Materials, J-STAGE early published review*, Mar. 27, 2017.

Extended European Search Report dated May 6, 2020 for the corresponding European Patent Application No. 18896544.6.

* cited by examiner (a)

(b)

SOLDER ALLOY

CROSS-REFERENCE TO RELATED PATENT APPLICATIONS

This application is a U.S. National Phase Application under 35 U.S.C. § 371 of International Patent Application No. PCT/JP2018/047747, filed Dec. 26, 2018, and claims the benefit of priority to Japanese Patent Application No. 2017-255303, filed on Dec. 31, 2017, all of which are incorporated herein by reference in their entirety. The International Application was published in Japanese on Jul. 4, 2019 as International Publication No. WO/2019/131718 under PCT Article 21(2).

FIELD OF THE INVENTION

The present invention relates to a solder alloy excellent in continuous castability and a solder joint including the solder alloy.

BACKGROUND OF THE INVENTION

Electronic components are mounted on a printed circuit board. Examples of the step of mounting the electronic components include flow soldering, dip soldering, and the like. The flow soldering is a method in which soldering is performed by applying a jet flow from a solder bath to a connection surface side of the printed circuit board. The dip soldering is a method in which a terminal such as a coil component is immersed in a solder bath to remove an insulating film and perform pre-solder plating.

For flow soldering or dip soldering, a solder bath is required. Since the solder bath is exposed to the atmosphere for a long time, dross generated in the solder bath must be removed at regular intervals. Further, the molten solder in the solder bath is consumed by soldering. Therefore, the solder alloy is periodically supplied to the solder bath. For the supply of the solder alloy, a bar solder is generally used.

As a method for manufacturing a bar solder, there is a method of pouring molten solder into a fixed mold and a continuous casting method in which molten solder is poured into a rotary mold. The continuous casting method is a method in which a raw material is put into a melting furnace and melted, and the molten solder in the melting furnace is cast into a groove of a rotary mold. Examples of the mold used in the continuous casting method include a mold having a shape in which a groove is provided at a central portion in a width direction of the annular plate. The molten solder solidifies after being cast into the groove of the rotary mold and is guided from the mold to the cutting step at a temperature of approximately 150° C. The guided continuous cast product is cut to a predetermined length to form a bar solder.

A continuous casting technique of a solder alloy is disclosed in, for example, JP 2017-196647 A. This publication describes that a cooling metal through which cooling water flows is brought into close contact with the outside of the mold, the cooling rate up to 280° C. is 3° C./s or more, preferably 20° C./s or more, and more preferably 50° C./s or more, and the structure of eutectic part is refined, in the Au—Sn based solder alloy. However, although Au is sometimes used as a high-temperature Pb-free solder alloy, Au is expensive and difficult to be processed.

Therefore, a Sn—Cu based solder alloy is mainly used for the bar solder. It is common that the Sn—Cu based solder alloy forms intermetallic compounds in solder alloys. When the alloy is manufactured by a continuous casting method, a coarse brittle intermetallic compound may be generated during solidification of the molten solder. When the coarse intermetallic compound is generated, the solder alloy may be cracked at the generation site, which may cause a problem that a continuous cast product cannot be formed. In addition, even when a continuous cast product can be formed, there is a risk of breakage during transportation.

As an example of studying the Sn—Cu based solder alloy, from the viewpoint of preventing the breakage of the joint formed of the solder alloy, for example, WO 2014/084242 A1 describes that a Sn—Cu—Ni based alloy is used as a low-temperature brazing material, a flux is applied to a joint site of a pipe, the alloy is dipped in a brazing filler metal, and then slowly cooled and solidified.

Technical Problem

The object of the invention described in WO 2014/084242 A1 is to provide an alloy that is easy to be used at a low melting point, and allows the Cu content to be in the range of 0.3% to 41.4%. However, as described in the publication, since the liquidus temperature at a Cu content of 41.4% is 640° C., and the alloy is slowly cooled and solidified, the coarse intermetallic compound precipitates in the alloy layer. Therefore, when the continuous cast product is manufactured using the Sn—Cu based alloy described in WO 2014/084242 A1, cracking or breakage may occur in the continuous cast product. When cracking or breakage occurs in the continuous cast product, the continuous casting process is interrupted, and the casting process is restarted after the broken cast product is removed from the mold, so that the operation process is complicated.

Further, a longer continuous cast product is desired to be manufactured in recent years since the cost reduction due to the labor of the process and the reduction in the process time must always be pursued. Therefore, breakage of the continuous cast product during continuous casting is considered as a larger problem than ever before.

In addition, the viscosity of the molten solder varies greatly depends on the alloy composition, and depending on the composition, the molten solder is less likely to flow in the grooves of the rotary mold. For this reason, since the continuous cast product is thickened, the coarse intermetallic compound may be generated even when the mold is greatly cooled, resulting in breakage of the continuous cast product. Therefore, even when the Sn—Cu based alloy described in WO 2014/084242 A1 is applied to JP 2017-196647 A, breakage of the continuous cast product may occur.

An object of the present invention is to provide a solder alloy excellent in continuous castability.

Solution to Problem

The present inventors have re-studied the problem in the case where the alloy described in WO 2014/084242 A1 is manufactured as a continuous cast product. In WO 2014/084242 A1, the solder alloy is intended to be prevented from being broken by slowly cooling the brazing material during joining. For example, when slow cooling is performed as described in WO 2014/084242 A1, the coarse intermetallic compound is generated inside the solder alloy. At the site where the coarse intermetallic compound is generated, cracking occurs during solidification or breakage occurs when the solder alloy is cut. This is particularly noticeable in a hypereutectic alloy in which the Cu content is 0.8% or more.

Therefore, the present inventors focused on cooling during the manufacture of the continuous cast product, rather than focusing on cooling during joining as described in WO 2014/084242 A1. Specifically, in continuous casting using a Sn—Cu solder alloy having a Cu content of 0.8% or more, it was confirmed that the intermetallic compound generated inside the solder alloy was coarse when the casting was performed while cooling the mold as described in JP 2017-196647 A. Further, Yasutaka Hashimoto et al. (Current Status and Future Plan of Viscosity Measurement for the Lead-Free Solder, Journal of the Japan Institute of Metals and Materials, J-STAGE early published review, Mar. 27, 2017) report that the viscosity of the molten solder increases as the Cu content increases. It has been reported in the publication that, when the Cu content was increased from 0.7% to 7.6%, the viscosity at the same temperature was increased by about 1.5 times. Thus, when casting was performed with various Cu content, it is found that the fluidity of the molten solder in the mold was decreased as the Cu content was increased, and the frequency of occurrence of cracking during solidification was also increased as the plate thickness was increased.

In order to compensate for a decrease in the fluidity of the molten solder due to an increase in the Cu content, it is possible to incline the rotary mold such that the cast molten solder flows downward from the upstream. However, when the rotary mold is inclined, the cross-sectional shape of the continuous cast product is largely different from the shape of the groove of the mold, so that a desired continuous cast product cannot be obtained. On the other hand, when the inclination angle of the rotary mold is too large, the molten solder may protrude from the groove when the molten solder flows the curved portion of the rotary mold. Therefore, in the case of using the continuous casting method, the rotary mold must maintain the horizontal state.

The present inventors have further studied a molten solder so that the molten solder sufficiently flows in the mold to prevent cracking or breakage during solidification even when the molten solder having a high viscosity alloy composition is cast into a mold in a state where the rotary mold maintains the horizontal state. Although cracking or breakage of the continuous cast product have conventionally been considered to be induced by the vibration of the rotary mold, it is found that when micro vibration such as ultrasonic waves is applied to the molten solder cast in the mold, the fluidity of the molten solder in the mold is unexpectedly improved and the maximum grain size of the intermetallic compound is unexpectedly decreased. As a result, a continuous cast product having good quality without cracking or breakage during solidification can be manufactured, and the present invention has been accomplished.

SUMMARY OF THE INVENTION

The present invention accomplished based on these findings is as follows.

(1) A solder alloy, having an alloy composition comprising, in mass %, 0.8% to 10% of Cu with the balance being Sn and including an intermetallic compound, wherein the intermetallic compound has a maximum grain size of 100 µm or less in a region at least 50 µm away from a surface of the solder alloy.

(2) The solder alloy according to the above (1), wherein the alloy composition further contains, in mass %, 0.4% or less of Ni.

(3) The solder alloy according to the above (2), wherein the intermetallic compound is mainly $(Cu, Ni)_6Sn_5$.

(4) The solder alloy according to any one of the above (1) to (3), wherein the alloy composition further contains, in mass %, at least one of 0.3% or less of P, 0.3% or less of Ge, and 0.3% or less of Ga.

(5) The solder alloy according to any one of the above (1) to (4), wherein the alloy composition further contains at least one selected from at least one group of a group consisting of at least one of Bi, In, Sb, Zn, and Ag in a total amount of 5% or less, and a group consisting of at least one of Mn, Cr, Co, Fe, Si, Al, Ti, and rare earth elements in a total amount of 1% or less.

(6) The solder alloy according to any one of the above (1) to (5), wherein the following relationship (1) is satisfied:

$$\text{the maximum grain size (µm)} \times \text{area ratio (\%) of the intermetallic compound in the solder alloy} \leq 3000 \text{ (µm·\%)} \qquad (1).$$

BRIEF DESCRIPTION OF THE DRAWINGS

FIG. 2A is the image of Example 8, and FIG. 2B is the image of Comparative Example 4.

DETAILED DESCRIPTION OF THE INVENTION

Figure 1:
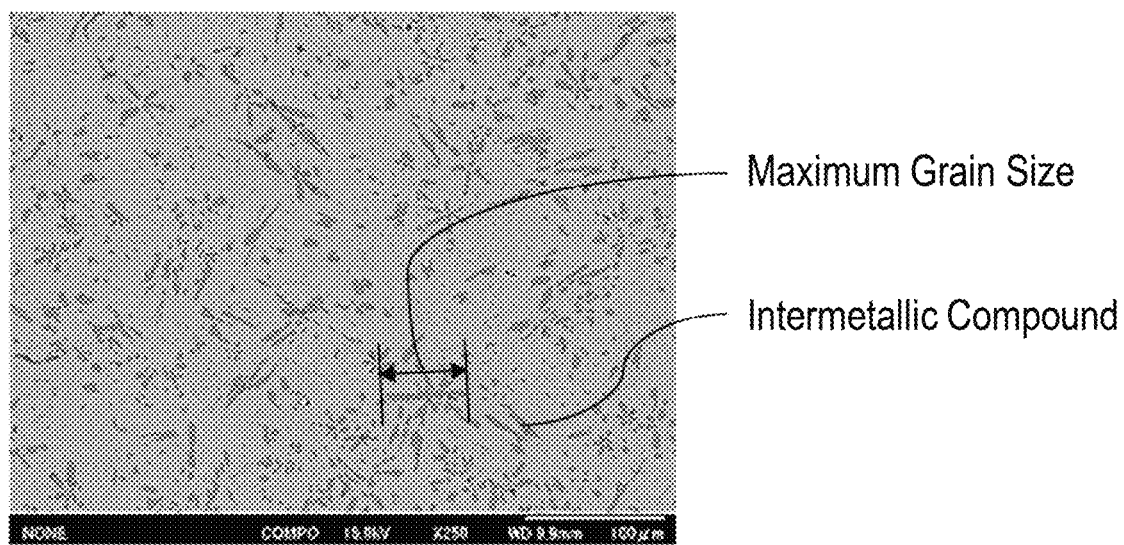
FIG. 1 is a cross-sectional image of a solder alloy in Example 7.

The present invention is described in detail below. In the description, "%" related to a solder alloy composition is "mass %", unless otherwise specified.

1. Alloy Composition of a Solder Alloy:

(1) Cu: 0.8% to 10%

The solder alloy of the present invention can solve the problem in the case of a hypereutectic alloy in which a coarse CuSn intermetallic compound is likely to be generated. When the Cu content is less than 0.7%, hypoeutectic occurs so that the primary crystal during solidification is Sn, when the Cu content exceeds 0.7%, hypereutectic occurs so that the primary crystal during solidification is a SnCu compound. When the primary crystal is a SnCu compound, the fluidity of the molten solder in the mold is deteriorated. However, when the Cu content is slightly higher than 0.7%, there is little influence of the intermetallic compound during casting regardless of the manufacturing conditions. Since the effect of the present invention is more likely to be exhibited as the Cu content is larger, in terms of the lower limit, the Cu content is 0.8% or more, preferably 1.0% or more, and more preferably 4.0% or more.

When the Cu content exceeds 10%, the liquidus temperature is high, which causes deterioration of workability. When the Cu content exceeds 10%, the area ratio of the intermetallic compound is too large. Further, since the viscosity of the molten solder increases and the fluidity in the mold is deteriorated, the coarse intermetallic compound is generated. As a result, cracking or the like occurs during solidification. In terms of the upper limit, the Cu content is 10% or less, preferably 8% or less, and more preferably 7% or less.

(2) Ni: 0.4% or less

Ni is an optional element capable of controlling the grain size of the SnCu intermetallic compound. When the Sn—Cu solder alloy contains Ni, Ni can be uniformly dispersed in $Cu_6Sn_5$ to make the grain size of the intermetallic compound finer and to prevent breakage of the continuous cast product. When the Ni content is 0.4% or less, an increase in liquidus temperature is within an allowable range, and thus good workability can be maintained. In terms of the upper limit, the Ni content is preferably 0.2% or less, and more preferably 0.15% or less. On the other hand, in order to achieve the effect based on the incorporation of Ni, in terms of the lower limit, the Ni content is preferably 0.03% or more, and more preferably 0.1% or more.

When Ni is contained, the intermetallic compound in the present invention is preferably mainly $(Cu, Ni)_6Sn_5$. The phrase "mainly $(Cu, Ni)_6Sn_5$" means that the ratio of the area of $(Cu, Ni)_6Sn_5$ to the total area of the intermetallic compound is 0.5 or more when the cross section of the solder alloy is observed.

(3) At least one of P: 0.3% or less, Ge: 0.3% or less, and Ga: 0.3% or less

These elements are optional elements capable of preventing oxidation of the solder alloy and improving the fluidity of the molten solder. In terms of the upper limit, when the content is 0.3% or less, the rise in liquidus temperature can be prevented, so that the time until solidification can be shortened and coarsening of the alloy structure can be prevented. In terms of the upper limit, the P content is preferably 0.3% or less, more preferably 0.1% or less, and further more preferably 0.025% or less. In terms of the upper limit, the Ge content and the Ga content is preferably 0.3% or less, respectively, and more preferably 0.15% or less, respectively. On the other hand, in order to achieve the effect based on the incorporation of these elements, in terms of the lower limit, the content of each element is preferably 0.005% or more, and more preferably 0.01% or more.

(4) At least one selected from at least one group of a group consisting of at least one of Bi, In, Sb, Zn, and Ag in a total amount of 5% or less, and a group consisting of Mn, Cr, Co, Fe, Si, Al, Ti, and rare earth elements in a total amount of 1% or less With regard to these elements, as long as the total amount of at least one of Bi, In, Sb, Zn, and Ag is 5% or less, and the total amount of at least one of Mn, Cr, Co, Fe, Si, Al, Ti, and rare earth elements is 1% or less, the continuous castability of the solder alloy in the present invention is not affected. In the present invention, the term "rare earth elements" refers to 17 kinds of elements which are Sc and Y belonging to Group 3 and 15 elements of the lanthanum group corresponding to the atomic numbers 57 to 71 in the periodic table.

In the present invention, at least one of Bi, In, Sb, Zn, Ag, Mn, Cr, Co, Fe, Si, Al, Ti, and rare earth elements may be included. With regard to the content of each element, the total amount of at least one of Bi, In, Sb, Zn, and Ag is preferably 5% or less, and the total amount of at least one of Mn, Cr, Co, Fe, Si, Al, Ti, and rare earth elements is preferably 1% or less. The total amount of at least one of Bi, In, Sb, Zn, and Ag is more preferably 1% or less, and the total amount of at least one of Mn, Cr, Co, Fe, Si, Al, Ti, and rare earth elements is more preferably 0.5% or less.

(5) Balance: Sn

The balance of the solder alloy in the present invention is Sn. In addition to the above elements, inevitable impurities may be contained. Even in the case where inevitable impurities are contained, the effects described above are not affected. Further, as is described below, even when an element not contained in the present invention is contained as an inevitable impurity, the effect described above is not affected.

(6) Alloy Structure

In the solder alloy in the present invention, the maximum grain size of the intermetallic compound is 100 µm or less in a region at least 50 µm away from the surface of the solder alloy.

With respect to the Sn—Cu solder alloy, in the related art, since only the grain size of the joining interface between the solder alloy and the electrode was focused, there was no report on the grain size of the cast product itself before joining. Further, in study of the conventional joining interface, since it was necessary to set manufacturing conditions in consideration of the influence on the substrate, the electronic component, or the like to be joined, the cooling rate could not be increased.

On the other hand, in the present invention, the problem of continuous casting can be solved for the first time by intentionally focusing on the alloy structure of the Sn—Cu solder alloy before solder bonding, which is a continuous cast product manufactured by continuous casting.

The molten solder is cooled from the contact surface with the mold, and the central portion farthest from the contact surface with the mold finally solidifies. This is because the cooling rate at the contact surface with the mold is faster than the cooling rate at the central portion. The faster the cooling rate is, the smaller the grain size is. Therefore, generally, the surface of the cast product cooled in the mold is finer than the central portion.

However, breakage during continuous casting cannot be prevented even when only the vicinity of the surface of the solder alloy has fine structure. Further, when a large amount of the intermetallic compound that is brittle and coarse is generated during solidification, the bulk of the solder alloy cannot be formed. When such an intermetallic compound exists inside, a large crack is generated inside, and therefore, there is a risk that the continuous cast product is broken in a step following continuous casting even when the crack does not appear on the surface due to the fine structure in the vicinity of the surface and breakage cannot be acknowledged from the appearance. Further, even when the average grain size in the inside of the solder alloy is defined, existence of one coarse intermetallic compound leads to breakage of the solder alloy. Therefore, in the present invention, the maximum grain size in the inside of the solder alloy is defined, and the maximum grain size is small, so that breakage can be avoided during continuous casting.

The maximum grain size in the present invention is defined as follows. A cross-sectional image of a cast product is observed to identify an intermetallic compound, and the largest grain is selected visually. Two lines parallel to each other are drawn for the grains so as to maximize an interval, and the interval is defined as the maximum grain size.

The smaller the maximum grain size is, the better the continuous castability is. Thus, in terms of the upper limit, the maximum grain size is preferably 100 µm or less, preferably 80 µm or less, more preferably 60.44 µm or less, further more preferably 58.50 µm or less, and even more preferably 50 µm or less.

The intermetallic compound is generated depending on the constituent elements. In the present invention, the intermetallic compound caused by the alloy composition containing Sn, Cu, and Ni is mainly $(Cu, Ni)_6Sn_5$ as described above.

In the present invention, the area ratio of the intermetallic compound in the solder alloy is preferably 40% or less, more preferably 30% or less, further more preferably 20% or less, particularly preferably 18.06% or less, and most preferably 15.15 µm or less from the standpoint of reducing the precipitation amount of the brittle intermetallic compound and preventing the breakage.

Furthermore, in the Sn—Cu solder alloy, when the intermetallic compound has a small grain size and precipitation amount of the brittle intermetallic compound is small, the breakage can be further prevented. In the solder alloy in the present invention, the following relationship (1) is preferably satisfied in consideration of the balance between them.

Maximum grain size (µm)×area ratio (%) of intermetallic compound in solder alloy≤3000 (µm·%)     (1)

The "area ratio of intermetallic compound in solder alloy" represents the ratio (%) of the area of the intermetallic compound existing on the cut surface to the area of the cut surface obtained by cutting the solder alloy. The right side of the above relationship (1) is more preferably 2500 µm·%, and more preferably 1500 µm·%.

2. Solder Joint

The solder joint is used, for example, for connection between an IC chip and a substrate (interposer) thereof in a semiconductor package, or for connection between a semiconductor package and a printed wiring board. Here, the "solder joint" refers to a connection portion of an electrode.

3. Method for Manufacturing Solder Alloy

As the method for manufacturing the solder alloy in the present invention, the solder alloy is manufactured by, for example, a continuous casting method. In the continuous casting method, first, a raw material is fed into a melting furnace so as to have a predetermined alloy composition and heated to approximately 350° C. to 500° C. to melt the raw material.

After all of the raw materials have melted, the molten solder in the melting furnace is continuously cast into the rotary mold.

The rotary mold has, for example, a groove at the central portion in a width direction of the annular plate. When the molten solder is cast, the molten solder is cast into the groove of the mold while rotating the rotary mold. The amount of the molten solder supplied to the mold is appropriately adjusted depending on the number of rotations of the mold and the frequency of micro-vibrations such as ultrasonic waves applied to the molten solder in the mold. For example, when an ultrasonic wave is applied, an ultrasonic vibration device is attached to the side surface of the rotary mold. In the present invention, the frequency of the ultrasonic wave applied to the molten solder is not particularly limited, but may be, for example, 10 kHz or more.

In the present invention, by attaching an ultrasonic device to the rotary mold and applying ultrasonic waves to the molten solder, the microstructure is obtained as described above. In the composition of the solder alloy of the present invention, the area ratio of the intermetallic compound is not too high, and a good balance with the maximum grain size is achieved. The details are unclear, but they are presumed as follows. In the Sn—Cu solder alloy, a SnCu compound is generated as a primary crystal during solidification, and a part having an excessively high Cu content is generated due to segregation, and a coarse SnCu compound may be formed. Therefore, in the present invention, the segregation of the SnCu compound is prevented by applying a micro-vibration such as an ultrasonic wave, and the generation of the coarse SnCu compound can be prevented.

The molten solder cast into the mold is cooled to approximately 150° C. at a cooling rate of about 10° C./s to 50° C/s. In order to obtain the cooling rate, the bottom of the rotary mold is immersed in cooling water, or the cooling water is circulated in the mold using a chiller or the like.

The cooled solder alloy is guided to the outside of the mold via the guide, and is cut to have a predetermined length. The solder alloy reaching the guide is cooled to approximately 80° C. to 200° C. In the solder alloy of the present invention, since the intermetallic compound inside the solder alloy is fine, breakage that may occur during a guide contact or the like in conventional cases can be prevented.

The solder alloy after cutting is shipped in the form of bar solder or the like. The solder alloy of the present invention is not broken by impact during transportation.

EXAMPLES (1) Preparation of Evaluation Sample

In order to demonstrate the effects of the present invention, a bar solder was prepared and evaluated as follows. Raw materials were weighed and put in a melting furnace, and melted in the melting furnace whose temperature was set as 450° C., and then molten solder was cast into the grooves of the rotary mold in which water was circulated. The cooling rate was approximately 30° C/s. An ultrasonic oscillator was attached to the rotary mold, and an ultrasonic wave having an output of 5 W and 60 kHz was applied when the molten solder was cast.

The continuous cast product was then guided from the rotary mold to the outside of the rotary mold. Then, the continuous cast product was cut to have an appropriate length, and bar solders were prepared so as to have a total length of 10 m including a bar solder having a width of 10 mm and a length of 300 mm The evaluation method is described below.

(2) Evaluation Method (2-1) Area Ratio of Intermetallic Compound (IMC)

The longitudinal center portion (cross section) of the prepared bar solder was cut, and an image of the composition image was taken using a scanning electron microscope SEM (magnification: 250 times). The obtained image was analyzed to identify an intermetallic compound. Since the intermetallic compound exhibited a dark gray color, the intermetallic compound was determined from the color tone. The ratio of the area of the intermetallic compound exhibiting dark gray to the image region was determined as the area ratio. The area ratio of 20% or less was denoted as "⊙", the area ratio of more than 20% and 40% or less was denoted as "○", and the area ratio of more than 40% was denoted as "×". As long as the evaluation of the area ratio is "⊙" or "○", there is no practical problem. In the evaluation, the area of the image region photographed at 250 times could be assumed to be the cross-sectional area of the solder alloy, and the total area of the dark gray portion could be assumed to be the area of all intermetallic compounds in the cross section.

(2-2) Maximum Grain Size

Among the intermetallic compounds identified from the obtained image, the largest grain was selected visually. Two parallel lines parallel to each other were drawn for the grains so as to maximize the interval, and the interval was set to the maximum grain size. The maximum grain size of 100 µm or less was denoted as "○", and the maximum grain size of more than 100 µm as denoted as "×".

(2-3) Relationship (1)

The value obtained by multiplying the results obtained from (2-1) and (2-2) of 3000 (μm·%) or less was denoted as "○", and the value exceeding 3000 (μm·%) was denoted as "×".

(2-4) Breakage of Bar Solder

With regard to the breakage of the bar solder, the bar solder from the solidification to the cutting was visually observed. The case where no chipping, breakage, collapse, or the like occurred in the bar solder was denoted as "○", and the case where a slight chipping, breakage, collapse, or the like occurred was denoted as "×".

Assuming that the breakage of the bar solder at room temperature occurs during transportation, using six surfaces of the bar solder having a width of 10 mm and a length of 300 mm as evaluation surfaces, the bar solder was manually freely dropped from the height of 1 m to the concrete surface with facing each evaluation surface downward (total six times), and the bar solder after the drop was visually observed. The "height of 1 m" represents the height of the evaluation surfaces of the bar solder from the concrete surface. In this drop test, the case where new chipping, cracking, or the like was not generated in the bar solder was denoted as "○", and the case where new chipping, cracking, or the like was generated was denoted as "×".

The evaluation results are shown below.

TABLE 1

| | Alloy composition (mass %) | | | | | | Ultrasonic vibration | Area ratio of IMC (%) | Maximum grain size | Relationship (1) | Breakage of bar solder (solidification to cutting) | Breakage of bar solder (room temperature) |
|---|---|---|---|---|---|---|---|---|---|---|---|---|
| | Sn | Cu | Ni | P | Ge | Ga | Others | | | | | |
| Example 1 | Bal. | 0.8 | | | | | | Applied | ○○ | ○ | ○ | ○ | ○ |
| Example 2 | Bal. | 5 | | | | | | Applied | ○○ | ○ | ○ | ○ | ○ |
| Example 3 | Bal. | 7 | | | | | | Applied | ○○ | ○ | ○ | ○ | ○ |
| Example 4 | Bal. | 10 | | | | | | Applied | ○ | ○ | ○ | ○ | ○ |
| Example 5 | Bal. | 1 | 0.1 | | | | | Applied | ○○ | ○ | ○ | ○ | ○ |
| Example 6 | Bal. | 5 | 0.03 | | | | | Applied | ○○ | ○ | ○ | ○ | ○ |
| Example 7 | Bal. | 5 | 0.15 | | | | | Applied | ○○ | ○ | ○ | ○ | ○ |
| Example 8 | Bal. | 5 | 0.4 | | | | | Applied | ○○ | ○ | ○ | ○ | ○ |
| Example 9 | Bal. | 10 | 0.4 | | | | | Applied | ○ | ○ | ○ | ○ | ○ |
| Example 10 | Bal. | 5 | 0.15 | 0.015 | | | | Applied | ○○ | ○ | ○ | ○ | ○ |
| Example 11 | Bal. | 5 | 0.15 | 0.03 | | | | Applied | ○○ | ○ | ○ | ○ | ○ |
| Example 12 | Bal. | 7 | 0.15 | 0.015 | 0.02 | | | Applied | ○○ | ○ | ○ | ○ | ○ |
| Example 13 | Bal. | 7 | 0.15 | 0.015 | 0.3 | | | Applied | ○○ | ○ | ○ | ○ | ○ |
| Example 14 | Bal. | 5 | 0.15 | 0.015 | | 0.02 | | Applied | ○○ | ○ | ○ | ○ | ○ |
| Example 15 | Bal. | 5 | 0.15 | 0.015 | | 0.15 | | Applied | ○○ | ○ | ○ | ○ | ○ |
| Example 16 | Bal. | 5 | 0.15 | 0.015 | | 0.3 | | Applied | ○○ | ○ | ○ | ○ | ○ |
| Example 17 | Bal. | 5 | 0.15 | 0.015 | | 0.02 | Bi: 0.05 | Applied | ○○ | ○ | ○ | ○ | ○ |
| Example 18 | Bal. | 5 | 0.15 | 0.015 | | 0.02 | In: 0.05 | Applied | ○○ | ○ | ○ | ○ | ○ |
| Example 19 | Bal. | 5 | 0.15 | 0.015 | | 0.02 | Sb: 0.05 | Applied | ○○ | ○ | ○ | ○ | ○ |
| Example 20 | Bal. | 5 | 0.15 | 0.015 | | 0.02 | Zn: 0.05 | Applied | ○○ | ○ | ○ | ○ | ○ |
| Example 21 | Bal. | 5 | 0.15 | 0.015 | | 0.02 | Ag: 0.05 | Applied | ○○ | ○ | ○ | ○ | ○ |
| Example 22 | Bal. | 5 | 0.15 | 0.015 | | 0.02 | Mn: 0.01 | Applied | ○○ | ○ | ○ | ○ | ○ |
| Example 23 | Bal. | 5 | 0.15 | 0.015 | | 0.02 | Cr: 0.01 | Applied | ○○ | ○ | ○ | ○ | ○ |
| Example 24 | Bal. | 5 | 0.15 | 0.015 | | 0.02 | Co: 0.01 | Applied | ○○ | ○ | ○ | ○ | ○ |
| Example 25 | Bal. | 5 | 0.15 | 0.015 | | 0.02 | Fe: 0.01 | Applied | ○○ | ○ | ○ | ○ | ○ |
| Example 26 | Bal. | 5 | 0.15 | 0.015 | | 0.02 | Si: 0.01 | Applied | ○○ | ○ | ○ | ○ | ○ |
| Example 27 | Bal. | 5 | 0.15 | 0.015 | | 0.02 | Al: 0.01 | Applied | ○○ | ○ | ○ | ○ | ○ |
| Example 28 | Bal. | 5 | 0.15 | 0.015 | | 0.02 | Ti: 0.01 | Applied | ○○ | ○ | ○ | ○ | ○ |
| Example 29 | Bal. | 5 | 0.15 | 0.015 | | 0.02 | Rear earth: 0.01 | Applied | ○○ | ○ | ○ | ○ | ○ |
| Example 30 | Bal. | 10 | 0.4 | | | | Ag: 5 | Applied | × | ○ | × | ○ | ○ |
| Comparative Example 1 | Bal. | 15 | | | | | | Applied | × | × | × | × | × |
| Comparative Example 2 | Bal. | 15 | | | | | | Not Applied | × | × | × | × | × |
| Comparative Example 3 | Bal. | 10 | 0.15 | | | | | Not Applied | ○ | × | × | × | × |
| Comparative Example 4 | Bal. | 5 | 0.4 | | | | | Not Applied | ○ | × | × | × | ○ |
| Comparative Example 5 | Bal. | 5 | 0.4 | 0.015 | | | | Not Applied | ○ | × | × | × | ○ |
| Comparative Example 6 | Bal. | 7 | 0.4 | 0.015 | 0.02 | | | Not Applied | ○ | × | × | × | × |
| Comparative Example 7 | Bal. | 5 | 0.4 | 0.015 | | 0.15 | | Not Applied | ○ | × | × | × | ○ |
| Comparative Example 8 | Bal. | 10 | 0.4 | | | | Ag: 5 | Not Applied | × | × | × | × | × |

Underlining indicates that the value is outside the scope of the present invention.

As is clear from the results of Table 1, it was found that, in any of the Examples according to the present invention, the cast product could be continuously cast without breakage or the like of the solder alloy during continuous casting. In addition, even in the drop test after cooling to room temperature, no breakage of the bar solder was observed.

On the other hand, in Comparative Examples 1 and 2, since the Cu content was too large, the intermetallic compound became coarse, and breakage of the bar solder from solidification to cutting was confirmed. In addition, chipping or cracking occurred in the drop test at room temperature.

In Comparative Examples 3 and 6, since ultrasonic waves were not applied to the molten solder cast in the mold, breakage was observed from solidification to cutting, and new chipping or cracking were observed in the drop test at room temperature.

In Comparative Examples 4, 5 and 7, since ultrasonic waves were not applied to the molten solder cast in the mold, breakage was observed from solidification to cutting, but no new chipping or cracking was observed in the drop test at room temperature since the Cu content was relatively small. In Comparative Example 8, the precipitation amount of the coarse intermetallic compound was large, and breakage of the bar solder from solidification to cutting was confirmed. In addition, chipping or cracking occurred in the drop test at room temperature.

Furthermore, in Comparative Examples 1 to 8, in addition to breakage or the like, the occurrence of burrs and unevenness of thickness were observed in one bar solder, and a stable bar solder having no burr and a constant thickness was not manufactured unlike the Examples.

The results of observing the SEM image of the cross section are shown for Examples and Comparative Examples shown in Table 1.

FIG. 1 is a cross-sectional image of a solder alloy in Example 7. As apparent from the image, it was revealed that the maximum grain size in Example 7 in which ultrasonic waves were applied was 58.50 μm, which is 100 μm or less. In addition, it was revealed that the area ratio in Example 7 was 15% and that the relationship (1) was satisfied.

Figure 2:
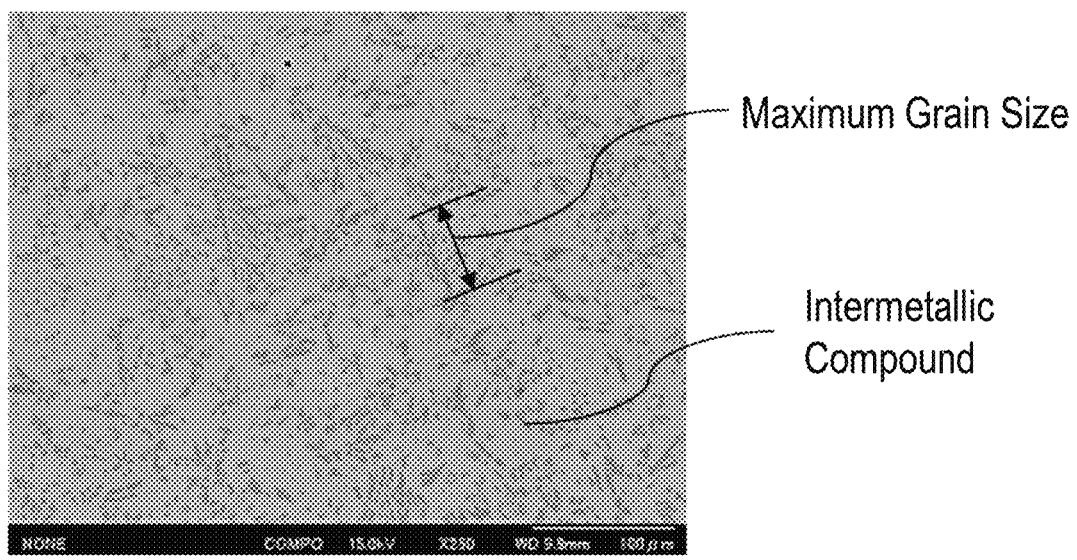
FIG. 2A and FIG. 2B are a cross-sectional images of solder alloys in Example 8 and Comparative Example 4.
Figure 2:
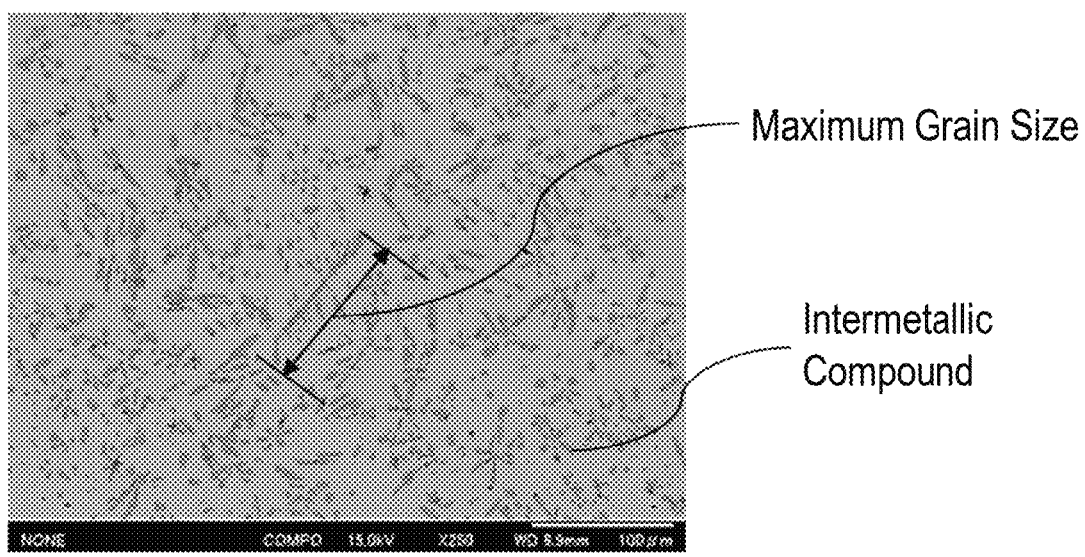

FIG. 2A and FIG. 2B are a cross-sectional images in Example 8 and Comparative Example 4, FIG. 2A is the image in Example 8, and FIG. 2B is the image in Comparative Example 4. FIG. 2A and FIG. 2B show a change in grain size depending on whether or not an ultrasonic wave is applied.

It was found that, in Example 8, the maximum grain size was 60.44 μm and the area ratio was 18.6%, and the relationship (1) was satisfied. In Examples 1 to 7 and Examples 9 to 29, it was confirmed in the same manner that the maximum grain size was 100 μm or less and the relationship (1) was satisfied.

On the other hand, it was found that, in Comparative Example 4, since no ultrasonic wave was applied, the maximum grain size was 108.72 μm which exceeds 100 μm, and the coarse intermetallic compound was precipitated. In addition, it was found that, in Comparative Example 4, the area ratio was 28.12% and the relationship (1) was not satisfied. Similarly, it was found that, in the other Comparative Examples, the maximum grain size was more than 100 μm and the relationship (1) was not satisfied.

The invention claimed is:

1. A solder alloy consisting of, in mass %:
   0.8% to 8% of Cu;
   optionally 0.4% or less of Ni;
   optionally at least one of 0.3% or less of P, 0.3% or less of Ge, and 0.3% or less of Ga; and
   optionally at least one element selected from at least one group of a group consisting of at least one of In and Zn in a total amount of 5% or less, and a group consisting of at least one of Mn, Cr, Fe, Si, Al, Ti, and rare earth elements in a total amount of 1% or less; and
   a balance of Sn,
   wherein an intermetallic compound is formed in the solder alloy, said intermetallic compound having a maximum grain size of 100 μm or less in a region at least 50 μm away from a surface of the solder alloy.

2. The solder alloy according to claim 1, wherein the intermetallic compound is mainly $(Cu, Ni)_6Sn_5$.

3. The solder alloy according to claim 1, wherein the following relationship (1) is satisfied:

$$\text{the maximum grain size (μm)} \times \text{area ratio (\%) of the intermetallic compound in the solder alloy} \leq 3000 \text{ (μ·\%)} \quad (1).$$

4. The solder alloy according to claim 2, wherein the following relationship (1) is satisfied:

$$\text{the maximum grain size (μm)} \times \text{area ratio (\%) of the intermetallic compound in the solder alloy} \leq 3000 \text{ (μm·\%)} \quad (1).$$

5. The solder alloy according to claim 1, wherein an amount of P is 0.005% or more and 0.3% or less, an amount of Ge is 0.005% or more and 0.3% or less, and an amount of Ga is 0.005% or more and 0.3% or less.

6. A solder alloy consisting of, in mass %:
   0.8% to 8% of Cu;
   optionally 0.4% or less of Ni;
   optionally at least one of 0.3% or less of P, 0.3% or less of Ge, and 0.3% or less of Ga; and
   optionally at least one element selected from at least one group of a group consisting of at least one of In, Sb and Zn in a total amount of 5% or less, and a group consisting of at least one of Mn, Cr, Co, Fe, Si, Al, Ti, and rare earth elements in a total amount of 1% or less; and
   a balance of Sn,
   wherein an intermetallic compound is formed in the solder alloy, said intermetallic compound having a maximum grain size of 100 μm or less in a region at least 50 μm away from a surface of the solder alloy.

* * * * *